UNITED STATES PATENT OFFICE 2,227,837

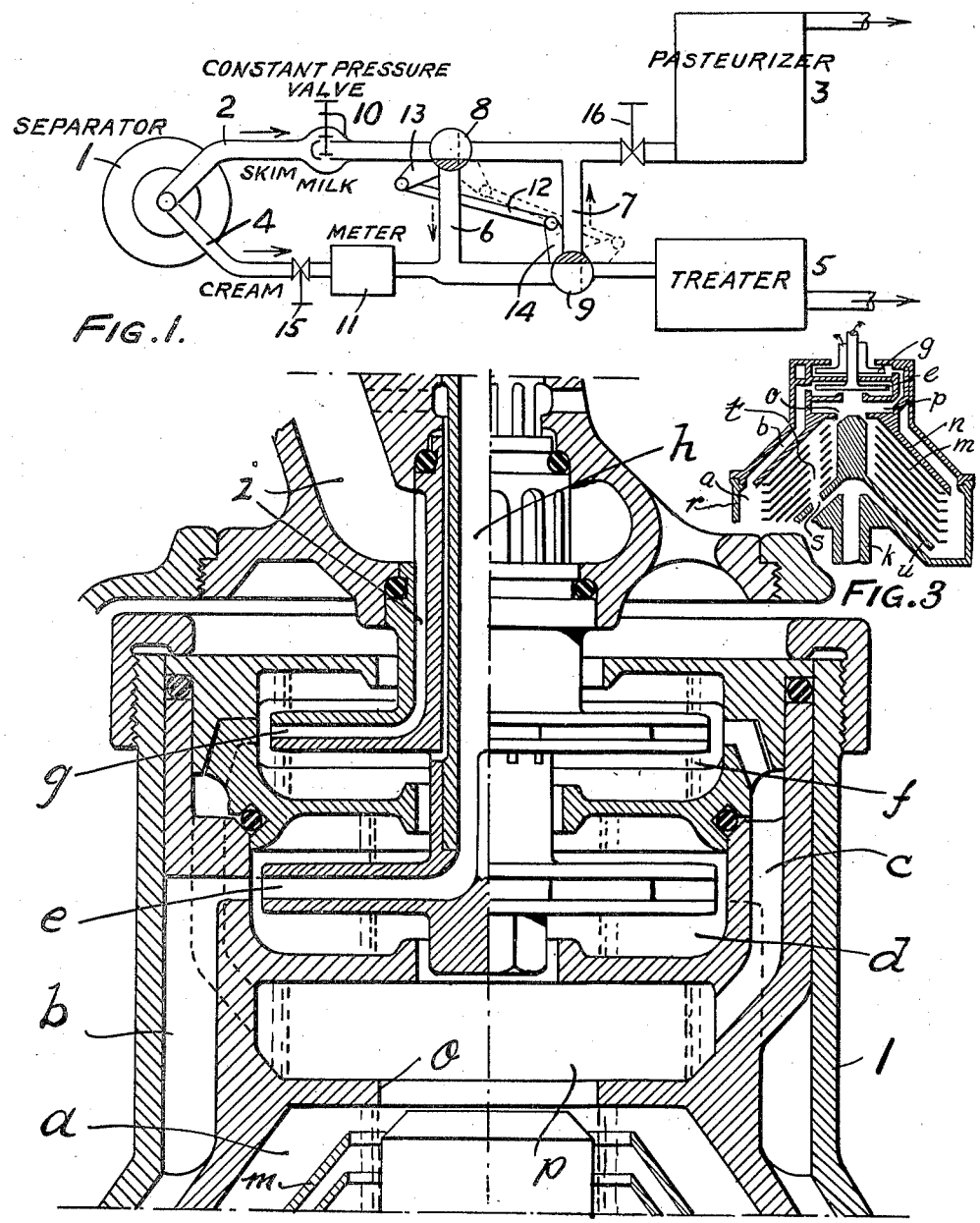

DAIRY INSTALLATION FOR SEPARATION AND PURIFICATION OF MILK

Hans Olof Lindgren, Appelviken, Sweden, assignor to The De Laval Separator Company, New York, N. Y., a corporation of New Jersey Application February 25, 1938, Serial No. 192,465
In Sweden March 5, 1937

4 Claims. (Cl. 31—2)

In small dairies it is desirable to be able to use the same apparatus for the separation from whole milk of milk and cream and their separate treatment (particularly preparatory to the use of the cream in the production of butter) and for the clarification of the whole milk preparatory to its sale and consumption as such.

In installations comprising a single separator provided with collecting vessels for skim milk and cream, when it is desired merely to clarify the whole milk, it is usual to remove the wall between the collecting chambers for cream and milk. The cream leaving the bowl in a finely divided state is thereby well mixed with the skim milk. The purified whole milk is then pumped through a pasteurizer of a suitable type, usually a plate pasteurizer. When it is desired to maintain the cream separate, whether for sale as such or for the production of butter, the skim milk is passed through the same pasteurizer, while the cream is generally pasteurized in a smaller pasteurizer of the same type, the cream being forced therethrough by a pump communicating with the cream-collecting vessel.

In installations comprising a separator of the so-called air-tight type, in which the outflow pipes for cream and skim milk are coupled to the bowl outlets by means of stuffing boxes, a third pipe may connect the said two pipes, and by providing a three-way cock at the junction of the third pipe with the cream pipe, the cream may be directed either to the cream pasteurizer or to the skim milk outflow pipe, thus enabling the apparatus to be operated either as a separator or a purifier. When operated as a purifier, the whole milk is forced through the pasteurizer and cooler by the pressure generated by the separator.

The object of the present invention is to enable the use, either as a purifier or as a separator, of apparatus including a separator of the type in which the cream and skim milk discharging from the separating space of the bowl are conveyed to paring chambers rotating with the bowl and are discharged therefrom by means of stationary paring discs. An objection to the use of such a separator, with outflow connections as described above when the same is used as an airtight separator, is that the paring disc for the cream must be so dimensioned that it generates a higher pressure than the paring disc for the skim milk, in order that the cream shall be brought to the skim milk pipe by its own pressure. It is, however, for other reasons, highly desirable that the paring disc for the skim milk shall generate a higher pressure than the paring disc for the cream; for example, in order to insure that there shall be no flow, due to leakage, from the cream channels of the bowl to the skim milk channels. A more specific object of the invention is, therefore, to enable the use, either as a separator or as a purifier, of apparatus including a separator containing paring devices in which there is maintained a higher pressure on the skim milk than on the cream.

In the accompanying drawing:

Fig. 1 is a diagrammatic view of an apparatus embodying my invention.

Fig. 2 is a view, mainly in vertical section, of the upper part of a centrifugal separator adapted for use in the apparatus of Fig. 1. Fig. 3 is a diagram, on a much reduced scale, of the main parts of the separator.

The separator, except for the cream and skim milk delivery means, may be of any conventional design, such, for example, as shown in Fig. 3, in which a bowl $r$ is mounted on a hollow driving spindle $k$, through which the whole milk is delivered to the center of the bowl. The bowl is equipped with a "liner" comprising a plurality of frusto-conical "discs" $m$ separated by the usual calks (not shown) thereon and clamped between the top disc $n$ and the bottom disc $u$. Whole milk, from the hollow spindle $k$, flows outward under the bottom disc $u$ and thence upward through sets of vertically aligning holes $t$, which distribute it to the spaces between the discs $m$, wherein it is separated into skim milk and cream. The skim milk discharges from the periphery of the bowl into channels $b$ between the so-called top disc $n$ and the hood of the bowl. The cream overflows the weir $o$ and discharges into a chamber $p$ beneath the paring chamber through a channel $c$ into a paring chamber $f$. The skim milk discharges through a stationary disc parer $e$ into a central passage $h$, while the cream discharges through a stationary disc parer $g$ into a passage $i$ surrounding passage $h$. With the construction shown, i. e., the skim milk parer larger than the cream parer, and the conditions shown, i. e., the skim milk parer deeply submerged and the cream parer submerged to the minimum amount that will exclude air therefrom, the pressure in the skim milk pipe will be much greater than that in the cream pipe.

Referring to Fig. 1: The outlet passage $h$ from the separator 1 is in closed communication with the skim milk outflow pipe 2 leading to the pasteurizer 3, while the outlet passage $i$ from the separator 1 is in closed communication with the cream outflow pipe 4 leading to any apparatus 5, such as a pasteurizer, for further treatment. Between the pipes 2 and 4 are two connecting pipes 6 and 7. At the junction of the skim milk pipe 2 and the cross-connecting pipe 6 nearer the separator is a three-way valve 8. At the junction of the cream pipe 4 and the cross-connecting pipe 7 further from the separator is a three-way valve 9. Between the centrifuge and the valve 8 the skim milk outflow pipe 2 is provided with an automatic valve 10 adapted to maintain a constant pressure in the skim milk pipe 2 beyond the valve. In the cream outflow pipe 4 a meter 11 is interposed.

When the apparatus is used for separation, the valves 8 and 9 are adjusted as shown in full lines in Fig. 1. There being then no communication between the pipes 2 and 4, the skim milk and cream are not remixed and flow separately to the pasteurizer 3 and the treating device or devices 5. When the installation is used for the purification of whole milk, the valves 8 and 9 are shifted to the dotted line positions shown. For convenience in operating the valves, they may be provided with arms 13 and 14 connected by a link 12, so that they are operable only in unison. In this position of the valve mechanism the skim milk flows from pipe 2 through cross-pipe 6 to pipe 4, wherein it is mixed with the cream, the mixture then flowing through cross-pipe 7 to pipe 4 and thence to the pasteurizer 3.

It is desirable to avoid the discharge of too small an amount of cream through the cream paring disc g in order to avoid agglomeration of cream in the central part of the bowl, which more easily occurs in purification than in separation due to the lower temperature employed in purification. When the installation is arranged for purification, it is therefore of importance to control the rate of outflow of cream to insure that the percentage of cream and thus also its absolute amount shall be sufficiently high. With the aid of the meter 11, the amount of cream may be predetermined and controlled by throttling either of the outflow pipes; for example, by means of a regulating valve 15 in the cream outflow pipe 4. This, however, involves a reduction of pressure in the pipe 4 beyond the valve and hence also in the pasteurizer. To avoid this reduction of pressure, it is preferable to provide a regulating valve 16 in skim milk outflow pipe 2 and to regulate the cream percentage according to the reading of the cream meter 11.

What I claim and desire to protect by Letters Patent is:

1. A dairy installation adapted to separate whole milk into cream and skim milk and prepare them for separate treatment and also to purify the whole milk and prepare it for treatment, the same comprising a centrifugal separator provided with pressure generating paring devices for the skim milk and cream of which the paring device for the skim milk generates the higher pressure, outflow pipes from the respective paring devices, and means operable in one position to maintain separate flow through the two pipes preparatory to separate treatment of the cream and the skim milk and operable in another position to divert the flow of skim milk into the cream pipe to effect their admixture as whole milk preparatory to treatment as such.

2. A dairy installation adapted to separate whole milk into cream and skim milk and prepare them for separate treatment and also to purify the whole milk and prepare it for treatment, the same comprising a centrifugal separator provided with paring devices for the skim milk and cream of which the paring device for the skim milk generates the higher pressure, outflow pipes from the respective paring devices, and means operable in one position to maintain separate flow through the two pipes preparatory to separate treatment of the cream and the skim milk and operable in another position to divert the flow of skim milk into the cream pipe to effect their admixture and thence direct the resultant restored whole milk into the skim milk pipe at a point beyond that at which the skim milk is diverted to the cream pipe.

3. A dairy installation comprising a centrifugal separator provided with paring devices for the skim milk and cream of which the paring device for the skim milk generates the higher pressure, outflow pipes from the respective paring devices, treating devices to which the respective outflow pipes lead, and means operable in one position to maintain separate flow through the two pipes to the respective treating devices and operable in another position to divert the skim milk into the cream pipe, thence direct the flow of both liquids in admixture to the skim milk pipe and thence to the skim milk treating device.

4. A dairy installation adapted to separate whole milk into cream and skim milk and prepare them for separate treatment and also to purify the whole milk and prepare it for treatment, the same comprising a centrifugal separator provided with paring devices for the skim milk and cream of which the paring device for the skim milk generates the higher pressure, outflow pipes from the respective paring devices, two cross pipes between said outflow pipes at different distances from the separator, and valves, one of which is operable in one position to maintain an independent flow of skim milk through the skim milk pipe and in another position to block the flow of skim milk through the skim milk pipe and connect it with the first cross pipe, and the other of which is operable in one position to maintain an independent flow of cream through the cream pipe and in another position to block the flow of liquid through the cream pipe and connect it through the second cross pipe with the milk pipe.

HANS OLOF LINDGREN.